US012794568B2

(12) United States Patent
Wardojo et al.

(10) Patent No.: US 12,794,568 B2
(45) Date of Patent: Nov. 10, 2026

(54) DIRECT CURRENT POWER ADAPTER FOR POWERING NETWORK EQUIPMENT

(71) Applicant: Verizon Patent and Licensing Inc., Basking Ridge, NJ (US)

(72) Inventors: Erwin Wardojo, McKinney, TX (US); John Valdez, Copper Canyon, TX (US); Raymond Whitsel, Lewisville, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 19/442,108

(22) Filed: Jan. 7, 2026

(65) Prior Publication Data

US 2026/0135378 A1 May 14, 2026

Related U.S. Application Data

(63) Continuation of application No. 19/268,072, filed on Jul. 14, 2025, now Pat. No. 12,573,844.

(Continued)

(51) Int. Cl.

*H04B 10/80* (2013.01)
*H02H 3/20* (2006.01)

(Continued)

(52) U.S. Cl.

CPC ........... *H04B 10/808* (2013.01); *H02H 3/202* (2013.01); *H02J 1/02* (2013.01); *H02J 1/082* (2020.01);

(Continued)

(58) Field of Classification Search

CPC .... H02J 1/082; H02J 1/084; H02J 1/02; H02J 9/061; H02H 3/202; H04L 12/10

See application file for complete search history.

(56) References Cited

U.S. PATENT DOCUMENTS 8,542,126 B2 * 9/2013 McKelvey ............ H04J 3/1694 340/636.15
8,818,192 B1 8/2014 Smith et al.

(Continued)

FOREIGN PATENT DOCUMENTS

CN 102983982 A 3/2013
CN 208337157 U 1/2019

OTHER PUBLICATIONS

"Common Area", Design Buildings, accessed online at: https://www.designingbuildings.co.uk/wiki/Common_area (May 2022).

(Continued)

*Primary Examiner* — Carlos Amaya

(57) ABSTRACT

A device may include a DC power input port configured to receive a primary DC power input from a DC power source. The device may include a primary DC power output port configured to supply a first DC power output to networking equipment. The device may include one or more battery connection ports configured to supply a second DC power output to a battery backup unit (BBU) when the DC power input port is active and receive a secondary DC power input from the BBU when the DC power input port is inactive. The device may include operating circuits configured to transform the secondary DC power input into the first DC power output when the DC power input port is inactive and transform the primary DC power input into the first DC power output and the second DC power output when the DC power input port is active.

30 Claims, 6 Drawing Sheets

Related U.S. Application Data

(60) Provisional application No. 63/719,004, filed on Nov. 11, 2024.

(51) Int. Cl.

| | |
|---|---|
| ***H02J 1/02*** | (2026.01) |
| ***H02J 1/08*** | (2026.01) |
| ***H02J 1/082*** | (2026.01) |
| ***H02J 9/06*** | (2006.01) |
| ***H04L 12/10*** | (2006.01) |
| ***H04L 12/40*** | (2006.01) |
| ***H04Q 11/00*** | (2006.01) |

(52) U.S. Cl.

CPC .............. *H02J 1/084* (2020.01); *H02J 9/061* (2013.01); *H04L 12/10* (2013.01); *H04L 12/40045* (2013.01); *H04Q 11/0067* (2013.01); *H04Q 11/0071* (2013.01); *H04Q 2011/0079* (2013.01)

(56) References Cited

U.S. PATENT DOCUMENTS

| | | | |
|---|---|---|---|
| 12,381,635 | B1 | 8/2025 | Wardojo et al. |
| 2006/0082222 | A1 | 4/2006 | Pincu et al. |
| 2007/0081549 | A1 | 4/2007 | Cicchetti et al. |
| 2009/0016721 | A1 * | 1/2009 | Wurst ........................ H04J 3/14 398/67 |
| 2009/0022306 | A1 * | 1/2009 | Wang .................. H04M 19/001 379/413 |
| 2010/0046940 | A1 | 2/2010 | Cotton et al. |
| 2010/0140365 | A1 | 6/2010 | Kalore |
| 2010/0310255 | A1 | 12/2010 | Trojer |
| 2011/0076866 | A1 | 3/2011 | Powell |
| 2014/0314412 | A1 | 10/2014 | Soto et al. |
| 2014/0369687 | A1 | 12/2014 | Jain |
| 2015/0078756 | A1 | 3/2015 | Soto et al. |
| 2016/0020911 | A1 | 1/2016 | Sipes, Jr. et al. |
| 2016/0241341 | A1 | 8/2016 | Endo et al. |
| 2016/0330334 | A1 | 11/2016 | Cooper et al. |
| 2017/0063542 | A1 | 3/2017 | Vilella et al. |
| 2017/0078455 | A1 | 3/2017 | Fisher et al. |
| 2017/0110885 | A1 | 4/2017 | Cheng et al. |
| 2017/0111976 | A1 | 4/2017 | Van Endert |
| 2017/0220098 | A1 | 8/2017 | Wang |
| 2017/0237497 | A1 | 8/2017 | Yogeeswaran et al. |
| 2017/0237506 | A1 * | 8/2017 | Soto ........................ H04B 10/00 398/116 |
| 2018/0331767 | A1 | 11/2018 | Shurki et al. |
| 2019/0182056 | A1 | 6/2019 | Ramanujam et al. |
| 2019/0289374 | A1 | 9/2019 | Vilella |
| 2020/0235607 | A1 | 7/2020 | Kanarellis et al. |
| 2020/0313771 | A1 | 10/2020 | Nakashima |
| 2020/0351117 | A1 | 11/2020 | Barnett, Jr. |
| 2020/0351118 | A1 | 11/2020 | Barnett, Jr. |
| 2021/0075520 | A1 | 3/2021 | Soto et al. |
| 2021/0176648 | A1 | 6/2021 | Labadie et al. |
| 2021/0281352 | A1 | 9/2021 | Clatanoff et al. |
| 2022/0052874 | A1 | 2/2022 | Cananzi |
| 2022/0303012 | A1 | 9/2022 | Takamuku et al. |
| 2022/0376935 | A1 | 11/2022 | Hsiao et al. |
| 2023/0011720 | A1 | 1/2023 | Synstelien et al. |
| 2023/0198616 | A1 | 6/2023 | Bluschke et al. |
| 2024/0098323 | A1 | 3/2024 | Biggs |

OTHER PUBLICATIONS

Rose, Connecting power supplies in parallel or series for increased output power, Bel Fuse, downloaded from the Internet at: https://www.belfuse.com/resource-library/blog/power-supplies-in-series-or-parallel-for-increased-power, Jun. 2020.

Zuloaga et al., In-building telecommunications infrastructure, WIK, Dec. 2022.

Xiao et al., An efficient power over ethernet (PoE) interface with current-balancing and hot-swapping control, IEEE Transactions on Industrial Electronics, 65(3) (Mar. 2018).

* cited by examiner

DIRECT CURRENT POWER ADAPTER FOR POWERING NETWORK EQUIPMENT

CROSS-REFERENCE TO RELATED APPLICATIONS

This application claims priority to and the benefit of the filing date of U.S. patent application Ser. No. 19/268,072, filed on Jul. 14, 2025, and U.S. Provisional Patent Application No. 63/719,004, filed on Nov. 11, 2024, the entire disclosures of which are hereby expressly incorporated by reference herein.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A conventional passive optical network (PON) includes one or more optical line terminals (OLTs), which are typically disposed at central locations, connecting to one or more optical last mile termination units (LMTUs) disposed at respective customer premises (e.g., physical locations serviced by the PON) via one or more optical fibers. A PON is typically implemented using a point-to-multipoint topology in which a feeder optical fiber from an OLT serves multiple last mile termination units. An LMTU may be, for example, an optical network terminal (ONT) or an optical network unit (ONU) that is optically connected to the OLT via a respective distribution optical fiber received at the LMTU. Typically, the distribution optical fibers for respective ones of the LMTUs are optically coupled to the feeder optical fiber via a fiber distribution hub (FDH) using an optical splitter. A fiber distribution terminal (FDT) may be utilized to connect feeder optical fibers to distribution optical fibers, for example.

A PON may provide services to multiple service locations within a multi-unit building which, as generally referred to herein, may be a building which is subdivided into multiple units, where each unit may require a separate account or instance of PON optical services. Examples of such multi-unit buildings include, for example, apartment and condominium buildings, duplexes, townhomes, office buildings, dormitories, strip malls, and the like; that is, those buildings in which PON services are separately provided to different multiple units (e.g., multiple tenants, multiple customers, etc.) within the building. Commonly, a multi-unit building is serviced by a Multi-Unit Optical Network Terminal (MU-ONT) which is typically disposed or mounted on the exterior of the building, e.g., on an outside wall or roof of the building. An MU-ONT may be, for example, an Optical Line Terminal (OLT), a Multi-Dwelling Unit (MDU) ONT, a router, a switch, etc., and may be a node of the PON. The MU-ONT includes an optical network interface via which the MU-ONT is optically connected to the PON, e.g., via one or more optical fibers, and also includes multiple customer-facing interfaces into which multiple lines or cables are received, where the multiple lines or cables communicatively connect the MU-ONT to multiple terminating units (TUs) located within the building. The multiple TUs may include, for example, Customer Premises Equipments (CPEs) such as modems, routers, residential gateways, and the like, and each TU may provide optical services (via the MU-ONT) to a respective end-user or customer of the PON. Different TUs may be located in and service different units within the multi-unit building.

A common problem with MU-ONTs and other similar networking equipment (e.g., other networking equipment deployed on a customer premises, at a central office, etc.) is that such equipment does not have access to a source of conditioned direct current (DC) power for its operations. For example, in the case of an MU-ONT, many times a power source that is external to (e.g., outside of) the building (e.g., on or near the location of the MU-ONT or a fiber drop location associated with the MU-ONT) is not readily available. Further, to bring outdoor power to MU-ONT locations is costly and time consuming, as doing so may require utilizing a third-party electrician. Still further, in some situations, powering MU-ONTs by using an outside power source (e.g., a third-party power source external to the building) may not even be possible given permits, homeowners' association (HOA) requirements and regulations, and/or jurisdictional regulations. Additionally, the lack of commercial power access presents challenges in establishing a cost-effective and dependable backup power system capable of providing 24-hour continuity. These difficulties stem from, for example, the unavailability of Direct Current (DC)-fed power adapters that can receive DC power from a variety of sources at a variety of voltages and deliver conditioned DC power to the load (e.g., the network equipment connected to and powered by such an adapter), and that separate the conditioned DC power for delivery to multiple recipients. Typically, currently-utilized back up power solutions include standard Alternating Current (AC) Uninterruptible Power Supplies (UPS) or DC Power Rectifiers, which both necessitate direct access to commercial AC power, which is not readily available at certain locations.

BRIEF SUMMARY OF THE INVENTION

In some aspects, the techniques described herein relate to a direct current (DC) power adapter for a networking equipment, the DC power adapter including: a DC power input port configured to electrically couple to a DC power source and receive a primary DC power input from the DC power source; a primary DC power output port configured to electrically couple to the networking equipment and supply a first DC power output to the networking equipment; one or more battery connection ports configured to electrically couple to a battery backup unit (BBU) and supply a second DC power output to the BBU when the DC power input port is active and receive a secondary DC power input from the BBU when the DC power input port is inactive; and one or more operating circuits electrically connected between the DC power input port, the primary DC power output port, and the one or more battery connection ports, the one or more operating circuits configured to: determine whether the DC power input port is active or inactive; transform the secondary DC power input into the first DC power output when the DC power input port is inactive; and transform the primary DC power input into the first DC power output and the second DC power output when the DC power input port is active, wherein respective voltages and currents of the first and second DC power outputs are based on a voltage and current of the primary DC power input.

In some aspects, the techniques described herein relate to a method for operating a direct current (DC) power adapter to provide power to a networking equipment, the method including: determining, via one or more operating circuits of the DC power adapter, whether a DC power input port of the DC power adapter is active or inactive, the DC power input port being electrically coupled to a DC power source to receive a primary DC power input from the DC power source; when the DC power input port is active, transforming, via the one or more operating circuits, the primary DC power input into a first DC power output and a second DC power output, wherein: respective voltages and currents of the first and second DC power outputs are based on a voltage and current of the primary DC power input, a primary DC power output port of the DC power adapter is electrically coupled to the networking equipment to supply the first DC power output to the networking equipment, and one or more battery connection ports of the DC power adapter are electrically coupled to a battery backup unit (BBU) to supply the second DC power output to the BBU; and when the DC power input port is inactive, receiving, via the one or more battery connection ports, a secondary DC power input from the BBU and transforming, via the one or more operating circuits, the secondary DC power input into the first DC power output.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate examples of concepts that include the claimed invention and explain various principles and advantages of those examples.

Figure 1A:
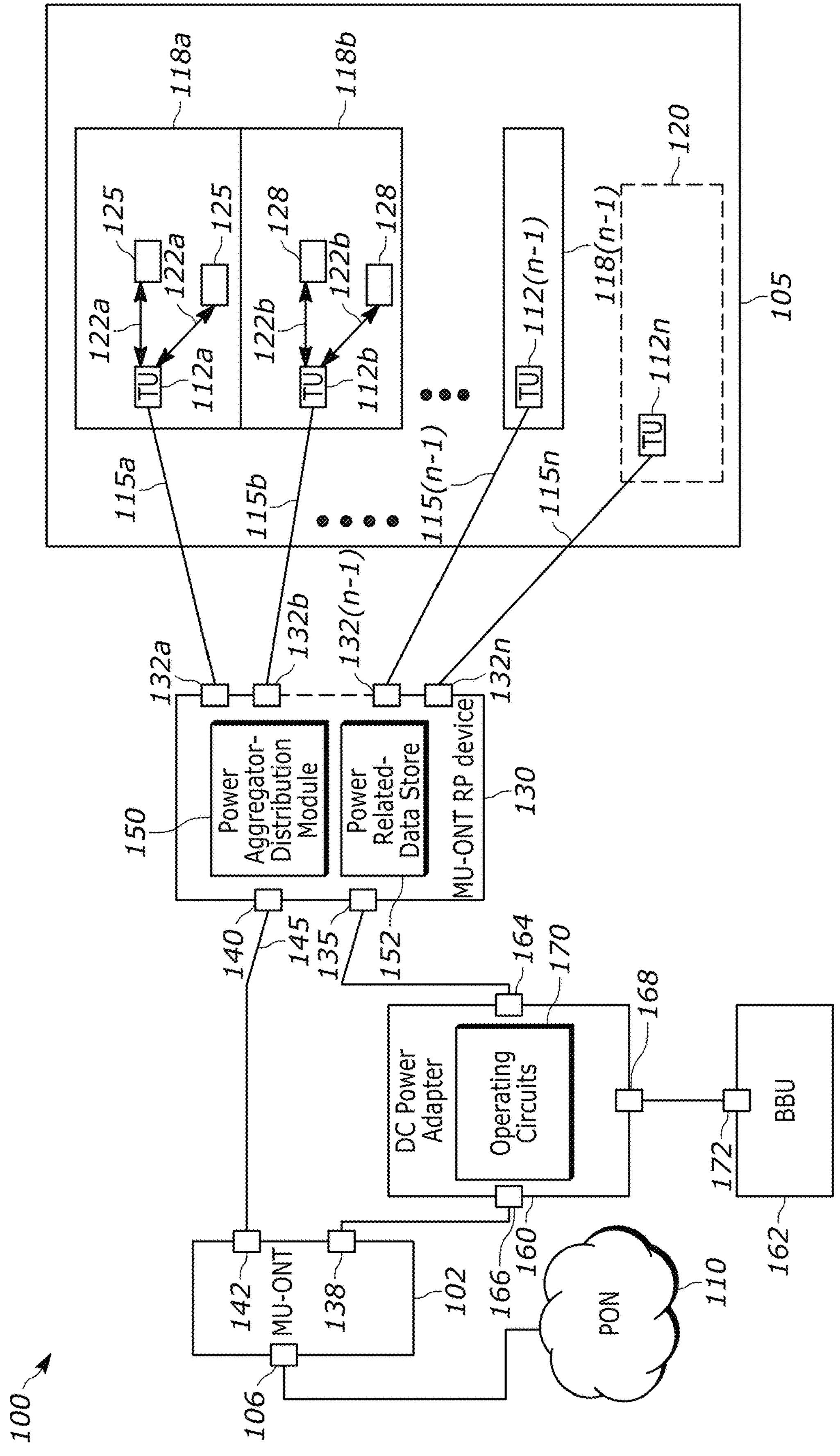
FIG. 1A is a block diagram of an example system for powering a Multi Unit Optical Network Terminal (MU-ONT) using a DC power adapter in which the systems, methods, and/or techniques of the present disclosure may be implemented.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the present disclosure.

The apparatus and method components have been represented where appropriate by conventional symbols in the drawings, showing only those specific details that are pertinent to understanding examples of the present disclosure so as not to obscure the disclosure with details that will be readily apparent to those of ordinary skill in the art having the benefit of the description herein.

Although the figures show parts with clean lines and boundaries, some or all of these lines and/or boundaries may be idealized. In reality, the boundaries and/or lines may be unobservable, blended, and/or irregular. Use of terms such as up, down, top, bottom, side, end, front, back, etc. herein are used with reference to a currently considered or illustrated orientation. If they are considered with respect to another orientation, it should be understood that such terms must be correspondingly modified.

DETAILED DESCRIPTION

The methods, systems, devices, concepts, and techniques described herein are generally directed to a DC power adapter that is configured to couple to networking equipment to provide conditioned DC power from a primary DC power input and a secondary DC power input such as DC power supplied by a battery backup unit (BBU). Furthermore, the methods, systems, devices, concepts, and techniques described herein can be directed to use of such a DC power adapter in reverse power applications for a Multi-Unit Optical Network Terminal (MU-ONT) using a direct current (DC) input.

An MU-ONT may be an active network element or node (e.g., a terminal) of a Passive Optical Network (PON), and an MU-ONT may enable multiple (e.g., different) end-users or customers who are located in a same building to receive respective optical services provided via the PON. An MU-ONT is typically mounted on an exterior wall or roof of a building, and includes one or more network-facing optical network interfaces into which one or more optical fibers optically connecting the MU-ONT to a Passive Optical Network (PON) are received. Optical services may be provided to the customers located inside the building via the MU-ONT and the PON. Additionally, an MU-ONT typically includes one or more (and typically multiple) end-user facing communication interfaces into which lines or cables which communicatively connect the MU-ONT to one or more (and typically multiple) Terminating Units (TUs) disposed within the building are received. The TUs may service respective units, rooms, or areas within the multi-unit building, for example, and a TU may be a Customer Premises Equipment (CPE) such as a modem, router, residential gateway, etc. Within a unit being serviced by a TU, the TU may establish a wireless network (such as a Wi-Fi network and/or other types of short-range wireless networks) to which various consumer electronic devices (e.g., smart devices, televisions, smart home appliances, computers, telephones, IoT devices, etc.) located within the unit may connect and via which the various consumer electronic devices may receive and consume optical services provided via the PON and MU-ONT.

Within the building, the lines or cables communicatively connecting the TUs to the MU-ONT may include Power over Ethernet (POE) lines or cables, such as Cat6 and/or Cat6A Ethernet lines or cables. PoE lines or cables (which are generally and categorically referred to herein as "PoE lines") are able to support both the delivery of data (e.g., signals, messages, metadata, payload, content, etc.) related to the optical services as well as the delivery of electric power within a single, physical cable or line. For example, a PoE line may be a twisted pair or copper Ethernet cable over which both power (e.g., direct current or DC power) and data (e.g., optical services-related data) can be delivered to endpoints of the PoE line or cable (which are typically the MU-ONT and a respective TU disposed within the building).

The disclosed techniques, methods, systems, devices, and concepts may be directed to a DC power adapter that can power the MU-ONT or other network equipment as described herein using a primary DC power input or a secondary DC power input (e.g., a battery component of a BBU).

The DC power adapter may be configured to couple (e.g., electrically couple via electrical terminals, sockets, wire connectors, etc.) to the MU-ONT or other network equipment to manage and provide conditioned DC power from a primary DC power input and a secondary DC power input such as DC power supplied by a battery backup unit (BBU). In particular, the DC power adapter may include one or more operating circuits that are configured to determine whether a DC power input port is active or inactive, transform a secondary DC power input into a DC power output of the DC power adapter when the DC power input port is inactive, and transform a primary DC power input into the first DC power output and the second DC power output when the first DC power input port is active, where the respective voltages and currents of the first DC power output and second DC power output are based on a voltage and a current of the primary DC power input.

Utilizing the DC power adapter provides a stable, reliable, supply of regulated DC power to the MU-ONT or other connected network equipment from a variety of possible DC voltage values and sources. For example, the power adapter may be a carrier grade system that accepts DC input from a commercial power-backed source (e.g., −48 VDC or +24 VDC telecom plant) and delivers regulated, filtered DC output to the MU-ONT or to other network elements, components, or equipment (CPE, ONT, radio, switch, etc.). When the primary source fails, the DC adapter may draw from an external or internal back-up battery system that can provide up to 24 hours of runtime at the specified or required output load. Upon restoration of the primary input power source, the DC adapter can recharge the battery system with intelligent charge control while supplying clean DC power to the load.

As used herein, a "carrier grade system" may include a system or device (e.g., the various embodiments of the DC power adapter) that is configured to conform to one or more of the attributes, requirements, or standards of carriers as shown in Table 1 below.

TABLE 1

| Attribute | Carrier-Grade Requirements | Notes/Standards |
|---|---|---|
| Reliability | ≥99.999% uptime (five nines) | GR-63-CORE (NEBS), ITU-TK.20 |
| Backup Autonomy | Up to 24 hours @ full load | Defined by ETSI EN 300 132-2 |
| Battery Chemistry | $LiFePO_4$ with BMS | Safety: UL 1973, IEC 62133 |
| Environmental | −40° C. to +65° C. operating range | NEBS Level 3, Telcordia GR-3108 |
| EMI/RFI Shielding | Compliant with FCC Part 15, EN55032 | Class A |
| Surge Protection | IEC 61000-4-5, ANSI C62.41 | 1.5 kA/2.5 kV or higher surge suppression |
| Thermal Management | Passive or active | MTBF > 500,000 hours |
| Input Range | Wide DC input (e.g., 20-60 VDC) | Hot-swappable, polarity protection |
| Output Regulation | ±1-2% regulation over temp/load | 5 V, 12 V, or 48 V nominal outputs |
| Battery Management | Smart BMS: cell balancing, thermal cutoff | CAN/$I^2C$ interface optional |
| Safety Certifications | UL 60950/UL 62368, CE, FCC, RoHS | For North America and EU |
| Form Factor | 1RU, DIN rail, or wall mount | IP55+ rated for outdoor use |

In some embodiments, instead of obtaining or receiving primary power directly from a commercial power supply, the disclosed techniques, methods, systems, devices, and concepts may obtain or receive primary power from an MU-ONT reverse powering (RP), which is referred to interchangeably herein as a "reverse powering device," "RP device," or "MU-ONT RP device." The MU-ONT RP device may be disposed between the MU-ONT and the TUs which the MU-ONT services. For example, the MU-ONT RP device may be a device that is separate and distinct from the MU-ONT, or the MU-ONT RP may be included in the MU-ONT. At any rate, the MU-ONT RP device may be configured to obtain reverse power supplied via the PoE lines that connect the in-building TUs to the externally-mounted MU-ONT, and the MU-ONT RP subsequently may direct or provide the supplied reverse power to a DC (primary) input port of the DC power adapter. The DC power adapter may utilize the received reverse power (e.g., the primary DC power input) to utilize for powering the operations of the MU-ONT (e.g., via input power ports of the MU-ONT) and/or recharging the battery of the BBU of the DC power adapter.

When multiple PoE lines supply reverse power, the MU-ONT RP may aggregate the reverse power supplied by the multiple PoE lines. Additionally, the MU-ONT RP may distribute the power load of the MU-ONT and the battery of the BBU as mediated through the DC power adapter across the multiple supplying PoE lines, and may automatically adjust the distribution of the power load as various PoE lines are activated, deactivated, or otherwise experience changes in their respective supply of reverse power and/or other characteristics of the PoE lines. Additionally or alternatively, the MU-ONT RP may automatically adjust the distribution of the power load as the power demands of the MU-ONT RP change.

The MU-ONT RP device may also be configured to obtain, via the PoE lines, any data generated by the TUs (e.g., signals, messages, metadata, and other types of payload content related to optical services), and may direct or provide the data generated by the TUs to the MU-ONT for transmission over the PON. As such, in a sense, the MU-ONT RP device may be configured to split content that is received via the PoE lines connecting the TUs with the MU-ONT into a power feed and a data feed, and provide the power feed and the data respectively to input power ports of the DC power adapter and data ports of the MU-ONT (which may be existing, legacy data ports of the MU-ONT). Further, the MU-ONT RP device may be configured to aggregate the reverse power received via multiple PoE lines and provide the aggregated reverse power to the DC power adapter. Consequently, via the MU-ONT RP device, the DC power adapter and in turn the MU-ONT may readily obtain power to power its operations without requiring the use of any power source that is located outside of the building (e.g., without the use of any external or third-party power source), and in some cases without requiring additional (new) ports at the MU-ONT to do so, and without requiring any new chases or conduits to be installed at the building other than those already provided for access and routing the PoE lines to TUs within the building.

In the opposite, downstream direction (e.g., in the direction away from the PON and towards the end-user service locations), the MU-ONT RP device may obtain any data related to optical services (e.g., signals, messages, metadata, and other types of payload content related to the optical services) that has been received by the MU-ONT from the PON via the optical fiber(s) and a network-facing optical interface of the MU-ONT, and the MU-ONT RP device may direct or provide the received optical service-related data to respective TUs located within the building, e.g., via the PoE lines received at the MU-ONT RP device. As such, in an embodiment, the MU-ONT reverse powering device may, in a sense, in the downstream direction serve as a switch or router of various incoming data packets and/or streams that are received at the MU-ONT servicing the multi-unit building so that the incoming data packets and/or streams are routed to the intended TUs (e.g., the intended consumers or recipients) within the multi-unit building, and in the upstream direction serve as a power aggregator and/or power source for the DC power adapter and the MU-ONT. In an alternate embodiment, in the downstream direction the MU-ONT may perform the switching and/or routing of the data packets and/or streams received from the PON, while the MU-ONT RP serves as a data pass-through device in the downstream direction and serves as a power aggregator and/or power source of the DC power adapter and the MU-ONT in the upstream direction.

Example Environments for Powering MU-ONTs

To illustrate, FIG. 1A depicts an example environment 100 in which the concepts, techniques, methods, systems, and/or devices disclosed herein may be implemented. FIG. 1A depicts a Multi-Unit Optical Network Terminal (MU-ONT) 102 that is mounted on the outside of (e.g., on an external or exterior face of a wall or roof of) a multi-unit building 105. The MU-ONT 102 is optically connected, via an optical network interface 106 and one or more optical fibers 108, to a Passive Optical Network (PON) 110 via which the MU-ONT 102 can receive optical services to deliver to multiple terminating units (TUs) 112*a*, 112*b*, . . . , 112(*n*−1) disposed inside of the multi-unit building 105. TUs 112*a*-112*n* are communicatively connected to MU-ONT 102 via respective PoE lines or cables 115*a*, 115*b*, . . . , 115(*n*−1), 115*n*. As depicted in FIG. 1A, TU 112*a*, TU 112*b*, and TU 112(*n*−1) are respectively disposed in different units 118*a*, 118*b*, and 118(*n*−1) of the multi-unit building 105, whereas TU 112*n* is disposed in a common area 120 of the building 105 (e.g., in a hallway, utility room, laundry room, basement, etc.). As also depicted in FIG. 1A, TU 112*a* is a node of a local wireless network 122*a* servicing the unit 118*a* and via which one or more consumer electronic devices 125 disposed within the unit 118*a* may communicatively connect, and TU 112*b* is a node of a local wireless network 122*b* servicing the unit 118*b* and via which one or more consumer electronic devices 128 disposed within the unit 118*b* may communicatively connect. The local wireless networks 122*a*, 122*b* may operate by using any one or more short-range wireless communication technologies, such as Wi-Fi, Bluetooth, etc. In FIG. 1A, TU 112*n* disposed in common area 120 is not connected to any local wireless area network, and is not wirelessly connected to any consumer electronics devices disposed within the building 105. As such, the TU 112*n* may solely serve as a reverse power supply for the MU-ONT 102.

The example environment 100 further includes a MU-ONT reverse powering device 130 disposed in between the MU-ONT 102 and the TUs 110, and a DC power adapter 160 disposed between the MU-ONT 102 and the MU-ONT RP device 130. As shown in FIG. 1A, the environment 100 may also include a back-up battery unit (BBU) 162 configured to supply backup battery DC power to the MU-ONT 102 via the DC power adapter 160 as described in more detail elsewhere herein. While the MU-ONT RP device 130, the DC power adapter 160, and the BBU 162 are shown in FIG. 1A as being mounted on the exterior of the building 105, this is for ease of illustration purposes only. For example, the MU-ONT RP device 130, the DC power adapter 160, and the BBU 162 may be mounted or disposed somewhere within or inside the building 105, such as in common area 120 and/or on the internal face of the wall or roof on which the MU-ONT 102 is externally mounted. Further, while the MU-ONT RP device 130, the DC power adapter 160, and BBU 162 are shown in FIG. 1A as being a separate and distinct device from the MU-ONT 102, this is for ease of illustration purposes only. Indeed, in some embodiments, the MU-ONT RP device 130, the DC power adapter 160, and/or the BBU 162 may be included in the MU-ONT 102; that is, the MU-ONT 102 and one or more of the MU-ONT RP device 130, the DC power adapter 160, and the BBU 162 may be an integral device or, said another way, the MU-ONT 102 may include the MU-ONT RP device 130, the DC power adapter 160, and/or the BBU 162. It should be appreciated that additional combinations of the MU-ONT 102, the MU-ONT RP device 130, the DC power adapter 160, and the BBU 162 into integrated devices is possible.

At any rate, as shown in FIG. 1A, MU-ONT reverse powering device 130 includes one or more downstream-facing (e.g., in the direction of the end-users TU 112 and away from the PON 110) ports or communication interfaces 132*a*-132*n* into which PoE lines 115*a*-115*n* are received. As such, the ports 132*a*-132 are interchangeably referred to herein as "PoE ports" of the MU-ONT RP device 130. In the upstream-facing direction (e.g., in the direction of the PON 110), the MU-ONT RP device 130 includes one or more power output ports 135 via which reverse power received at the MU-ONT RP device 130 via PoE lines 115*a*-115*n* may be conditioned, transformed, and provided, via the DC power adapter 160, to the MU-ONT 102 as a primary DC input power, e.g., via one or more power input ports 138 of the MU-ONT 102. The power input ports 138 of the MU-ONT 102 may include one or more 48 volt DC ports, for example. Additionally, MU-ONT RP device 130 includes one or more data ports or communication interfaces 140 via which data corresponding to PON optical services that has been received at MU-ONT RP device 130 via the PoE lines 115 may be provided to MU-ONT 102, e.g., via one or more data ports 142 of the MU-ONT 102. The data ports 140, 142

(and therefore cable or line 145 connecting the ports 140 and 142) may support Ethernet, Internet Protocol (IP), and/or any other data protocol and/or delivery mechanism, for example, and may or may not be PoE Ethernet ports.

Additionally, in FIG. 1A, the MU-ONT RP device 130 is shown as including a power aggregation-distribution module 150. In an embodiment, the power aggregation-distribution module 150 may comprise a set of computer-executable instructions that are stored on one or more tangible memories of the MU-ONT RP device 130 and which may be executed by one or more processors of the MU-ONT RP device 130 to cause the MU-ONT RP device 130 to perform any one or more of the methods disclosed herein, and/or portions thereof. In some implementations, a power aggregation-distribution module 150 may be stored at one or more servers (which may or may not be one or more servers of the PON 110), and an instance of the stored power aggregation-distribution module 150 may be downloaded to or provisioned into the MU-ONT RP device 130, e.g., via the PON 110 or via a technician computing device. The power aggregation-distribution module 150 may cause the MU-ONT RP device 130 to aggregate reverse power provided via two or more of the PoE lines 115*a*-115*n*, and provide the aggregated reverse power to the DC power adapter 160, e.g., via power output ports 135. Additionally or alternatively, the power aggregation-distribution module 150 may determine a distribution scheme of a power load of the MU-ONT 102 (e.g., of a required, utilized, and/or demanded power load), and may aggregate and/or provide the reverse power supplied by the PoE lines 115*a*-115*n* to the DC power adapter 160 in accordance with the distribution scheme, such as in manners described in more detail elsewhere herein. Data indicative of the distribution scheme as well as other data generated and/or utilized by the power aggregation-distribution module 150 may be stored in a power-related data store 152 of the MU-ONT RP device 130, for example.

The inclusion of the power aggregation-distribution module 150 and the power-related data store 152 in the MU-ONT reverse powering device 130 as shown in FIG. 1A is only one of several possible embodiments, though. For example, in an embodiment, the power aggregation-distribution module 150 (or portions thereof) may be included in the MU-ONT 102 and/or the DC power adapter 160. Additionally or alternatively, the power-related data store 152 (of portions thereof) may be included in the MU-ONT 102 and/or the DC power adapter 160.

Turning now to the DC power adapter 160 shown in FIG. 1A, the DC power adapter 160 includes a DC power input port 164, a primary DC power output port 166, one or more battery connection ports 168, and one or more operating circuits 170. In some embodiments the DC power input port 164, the primary DC power output port 166, and the one or more battery connection ports 168 may include electrical terminals, sockets, wires, or other similar structures known in the art for electrically coupling together one or more components. The DC power input port 164 electrically couples (e.g., via one or more wires, cables, circuits, etc.) the DC power adapter 160 to a DC power source and receives a primary DC power input therefrom. As shown in FIG. 1A, the DC power source is the MU-ONT RP device 130, and the primary DC power input received at the DC power input port 164 of the DC power adapter 160 includes the reverse power supplied by the MU-ONT RP device 130 via the one or more power output ports 135 of the MU-ONT RP device 130. However, it should be appreciated that, in some embodiments, the primary DC power input for the DC power adapter 160 may additionally or alternatively be provided by another device different from the MU-ONT RP device 130 (not shown) and to which the DC power adapter 160 is electrically coupled via the DC power input port 164, such as a main line AC to DC power converter, a DC power generator, etc.

The primary DC power output port 166 of the DC power adapter 160 electrically couples (e.g., via one or more wires, cables, circuits, etc.) the DC power adapter 160 to the MU-ONT 102 (e.g., via the one or more power input ports 138 of the MU-ONT 102) and supplies a first DC power output to the MU-ONT 102. That is, in FIG. 1A, the MU-ONT 102 is the DC load of the DC power adapter 160. Additionally, the one or more battery connection ports 168 of the DC power adapter 160 electrically couple (e.g., via one or more wires, cables, circuits, etc.) the DC power adapter 160 to the BBU 162 via the BBU ports 172. Specifically, the one or more battery connection ports 168 of the DC power adapter 160 are configured to supply a second DC power output to the BBU 162 via one or more BBU ports 172 when the DC power input port 164 is active, and are configured to receive a secondary DC power input from the BBU 162 via one or more BBU ports 172 when the DC power input port 164 is inactive. For example, in some embodiments, the one or more battery connection ports 168 may include a secondary DC power input port configured to electrically couple the DC power adapter 160 to a power output port of the BBU 162 (e.g., one of the BBU ports 172) and receive the secondary DC power input therefrom. In these embodiments, the one or more battery connection ports 168 may also include a secondary DC power output port configured to electrically couple to a power input port of the BBU 162 (e.g., a different one of the BBU ports 172) and supply the second DC power output to the BBU 162. Alternatively, the one or more battery connection ports 168 may include a single connector configured to both supply the second DC power output to and receive the secondary DC power input from the BBU 162. The BBU 162 may include one or more batteries with an overall charge capacity configured to support a full load of the MU-ONT 102 for at least 24 hours. In some embodiments, the battery of the BBU 162 may be a Lithium Iron Phosphate ($LiFePO_4$) type battery. However, other suitable battery chemistries and/or technologies known in the art (e.g., solid state, zinc, sodium-ion, capacitors, supercapacitors, etc.) may be used in the BBU 162.

The one or more operating circuits 170 of the DC power adapter 160 electrically connect or are electrically connected between the DC power input port 164, the primary DC power output port 166, and one or more battery connection ports 168 of the DC power adapter 160. In operation, the one or more operating circuits 170 condition and transform the primary DC power input received at the DC power input port 164 and/or to condition and transform the secondary DC power input received from the BBU 162 at the one or more battery connection ports 168 (e.g., at different times and/or in different situations) into a stable and filtered first DC power output supplied from the primary DC power output port 166 of the DC power adapter 160 to the one or more power input ports 138 of the MU-ONT 102. As used herein conditioned DC power may include DC power where one or more of voltage spikes, harmonic noise, electromagnetic interference (EMI), transient fluctuations, and other undesired characteristics present (e.g., electrical characteristics that may be harmful to the DC load) on the DC input power are reduced and/or eliminated. Furthermore, transforming DC power may include changing the DC current or DV voltage (e.g., raising or lowering the current or voltage) to provide a set output voltage used to power the DC load.

More particularly, the one or more operating circuits 170 may operate as a function of the primary DC power input (e.g., may operate to transform different input amounts of current and voltage into a consistent voltage or current or range of voltages or currents that are acceptable for powering the connected DC load) that is supplied to and received at the DC power input port 164 of the DC power adapter 160. Furthermore, the one or more operating circuits 170 enable or allow the DC power adapter 160 to provide a consistent and stable (e.g., by conditioning and transforming the input voltage and current) DC current and voltage to the MU-ONT 102 (e.g., via the primary DC power output port 166) based on a wide range of possible DC voltage inputs which may be received via the DC power input port 164 and/or the one or more battery connection ports 168 of the DC power adapter 160. For example, the DC power adapter 160 may accept a voltage in the range of 20 to 60 volts as the primary DC power input received via the DC power input port 164 or the one or more battery connection ports 168, provide a first DC power output that is transformed to be a nominal current of 0.7 Amps at 54 VDC to power the MU-ONT 102, and to provide a second DC power output that is transformed to be at nominal current of 0.5 Amps at a range of 42-54 VDC to recharge the BBU 162 (e.g., a trickle charge). Additionally, the first DC power output and second DC power output may be conditioned The one or more operating circuits 170 may include a set of (e.g., one or more) power conditioning circuits that perform power conditioning operations (e.g., filtering, protection, isolation, voltage matching, etc.) and one or more control circuits that perform control operations (e.g., determining whether the DC power input port 164 is active or inactive, converting the input voltage for output on the primary DC power output port 166 and/or the one or more battery connection ports 168, and/or other control operations as described herein). However, it should be appreciated that any operations described herein as being performed by the power conditioning circuits and/or the control circuits may be performed in whole or part by any of the one or more operating circuits 170 (e.g., the power conditioning circuits may be configured to transform or otherwise modify the voltage values for output when conditioning the input voltage). Furthermore, it should be appreciated that "power conditioning" and "conditioning" are used interchangeably throughout.

In some embodiments, the one or more operating circuits 170 may output status alerts or alarms regarding the state of the DC power adapter 160 (e.g., via an integrated speaker, indicator light, network message, etc.). For example, the one or more operating circuits 170 may generate a respective status message or alarm when switching over to and/or switching back from receiving power from the BBU 162. These messages or alarms may be transmitted using Simple Network Management Protocol (SNMP), a dray contact alarm, or other suitable protocols or connection known in the art.

In some embodiments, the one or more operating circuits 170 may be configured to determine whether the DC power input port 164 is active (e.g., whether the DC power input port 164 is receiving an amount of DC power above or equal to a threshold value) or inactive (e.g., whether the DC power input port 164 is receiving an amount of DC power below or equal to the threshold value, including situations in which no DC power is being received at the DC power input port 164). When the DC power input port is inactive, the one or more operating circuits 170 may transform the secondary DC power input received via the one or more battery connection ports 168 from the BBU 162 into the first DC power output to power the MU-ONT or load 102. In some embodiments, the one or more operating circuits 170 may seamlessly transition between providing the first DC power output from power received at the DC power input port 164 to providing the first DC power output from DC power received via the one or more battery connection ports 168. This seamless switchover may occur in approximately 10 ms or less, for example. When the DC power input port is active, the one or more operating circuits 170 may transform the primary DC power input received at the DC power input port 164 into the first DC power output to power the MU-ONT/load 102 and optionally into the second DC power output to recharge the BBU 162. Further, in some situations, the voltage and current of the first DC power output and the voltage and current of the second DC power output may be based on the voltage and current of the primary DC power input. To accomplish this switch, the one or more operating circuits 170 may include one or more of switching components, relays, etc., that are actively or passively operated to switch between providing power via the BBU 162 or the DC power input port 164.

In some embodiments in which the DC power input port 164 is active, the voltage and current of the primary DC power input may be insufficient to supply approximately 5 Amps to the BBU 162. However, other thresholds may be used such as greater than or equal to 5 Amps, greater than or equal to 4.5 Amps, etc. In these embodiments, the one or more operating circuits 170 may transform the primary DC power input into the first DC power output provided to the MU-ONT 102 via the primary DC power output port 166 and the second DC power output supplied to the BBU 162 via the one or more battery connection ports 168 such that the first DC power output provides at least 0.5 Amps to the MU-ONT 102 and the second DC power output provides a trickle charge to the BBU 162. As used herein a "trickle charge" may include a slow, continuous charging method for the BBU 162 that maintains the charge of the BBU 162 at a preconfigured charging level (e.g., a fully charged level). Furthermore, a "trickle charge" may comprise a low-power charge of approximately 54 Vdc with small current value of approximately 0.5 Amps that keeps the battery (e.g., the BBU 162) at the preconfigured charge level. In some embodiments, the BBU 162 may include a battery management system that prevents overcharging of the BBU 162 (e.g., by electrically disconnection the BBU 162 from DC power adapter 160 or otherwise diverting electric charge aways from the battery of the BBU 162).

Further, when the DC power input port 164 is active and the voltage and current of the primary DC power input is greater than 5 Amps, the one or more operating circuits 170 may transform the primary DC power input into the first DC power output and the second DC power output such that the first DC power output is maintained at less than 1.1 Amps at 54 VDC and remaining available power is allocated to the second DC power output to recharge the battery of the BBU 162.

In some embodiments, the power conditioning circuits include at least one electrical isolator (e.g., an electrical transformer or similar) that isolates the primary DC power input (e.g., power received at the DC power input port 164) or the secondary DC power input (e.g., received at the one or more battery connection ports 168) from direct connection to the first DC power output. The electrical isolator may also server to transform the power input as described above or may output a mirror of the provided voltage and current. Additionally or alternatively, the power conditioning circuits may include one or more of an inductor and a capacitor configured to filter the primary DC power input or the secondary DC power input to reduce noise or ripple present in the first DC power output. Additionally or alternatively, the power conditioning circuits may include at least one protection component (e.g., a fuse, relay, etc.) configured to disconnect the DC power input or the secondary DC power input from the first DC power output in response to a surge condition.

The control circuits may include active components and/or passive components (e.g., combinations of resistors, capacitors, inductors, transformers, etc.) that are configured to transform the primary and secondary DC power input (e.g., to change the input current and voltage into a suitable output voltage and current) and determine whether the DC power input port is active or inactive, as well as to perform at least portions of any one or more methods disclosed herein. For example, the active components may include a processing unit that includes one or more processors, each of which may be a programmable microprocessor or the like that executes software or computer-executable instructions stored in memory unit to execute some or all of the functions of the DC power adapter 160 as described herein. The processing unit may include one or more graphics processing units (GPUs) and/or one or more central processing units (CPUs), for example. Alternatively, or in addition, one or more processors in the processing unit may be other types of processors (e.g., application-specific integrated circuits (ASICs), field-programmable gate arrays (FPGAs), etc.), and some of the functionality of the DC power adapter 160 as described herein may instead be implemented in hardware or via passive components of the one or more operating circuits 170. The memory unit may include one or more volatile and/or non-volatile memories. Any suitable memory type or types may be included in the memory unit, such as read-only memory (ROM) and/or random access memory (RAM), flash memory, a solid-state drive (SSD), a hard disk drive (HDD), and so on. Collectively, memory unit may store one or more software applications, the data received/used by those applications, and the data output/generated by those applications.

It should be appreciated that the DC power adapter 160 may be used and/or adapted for use to supply conditioned DC power to other networking equipment besides the MU-ONT 102. For example, the DC power adapter 160 may be deployed at a central office location (e.g., central office 204 of FIG. 2) to power various pieces of network equipment which are disposed at or in geographical proximity to the central office 204 (or, in some situations, an entirety of network equipment comprising the central office 204) and which are used to manage and operate the PON 110. Further, the DC power adapter 160 may be used to power some or all components of a fiber distribution hub (FDH) or fiber distribution terminal (FDT). Additionally, the DC power adapter 160 may be used to power various components of non-optical network infrastructures. For example, the DC power adapter 160 described herein may be adapted to power any of the networking or DC power electrical components such as digital service line access multiplexer (DSLAM) or other type of copper network component of a coper network such as shown and described in U.S. patent application Ser. No. 19/005,816 filed on Dec. 30, 2024 and titled "Anomaly Detection In Copper Networks," all of which is incorporated by reference herein in its entirety. Furthermore, the DC power adapter 160 may be powered from a variety of DC power input sources besides the MU-ONT RP device 130.

Figure 1B:
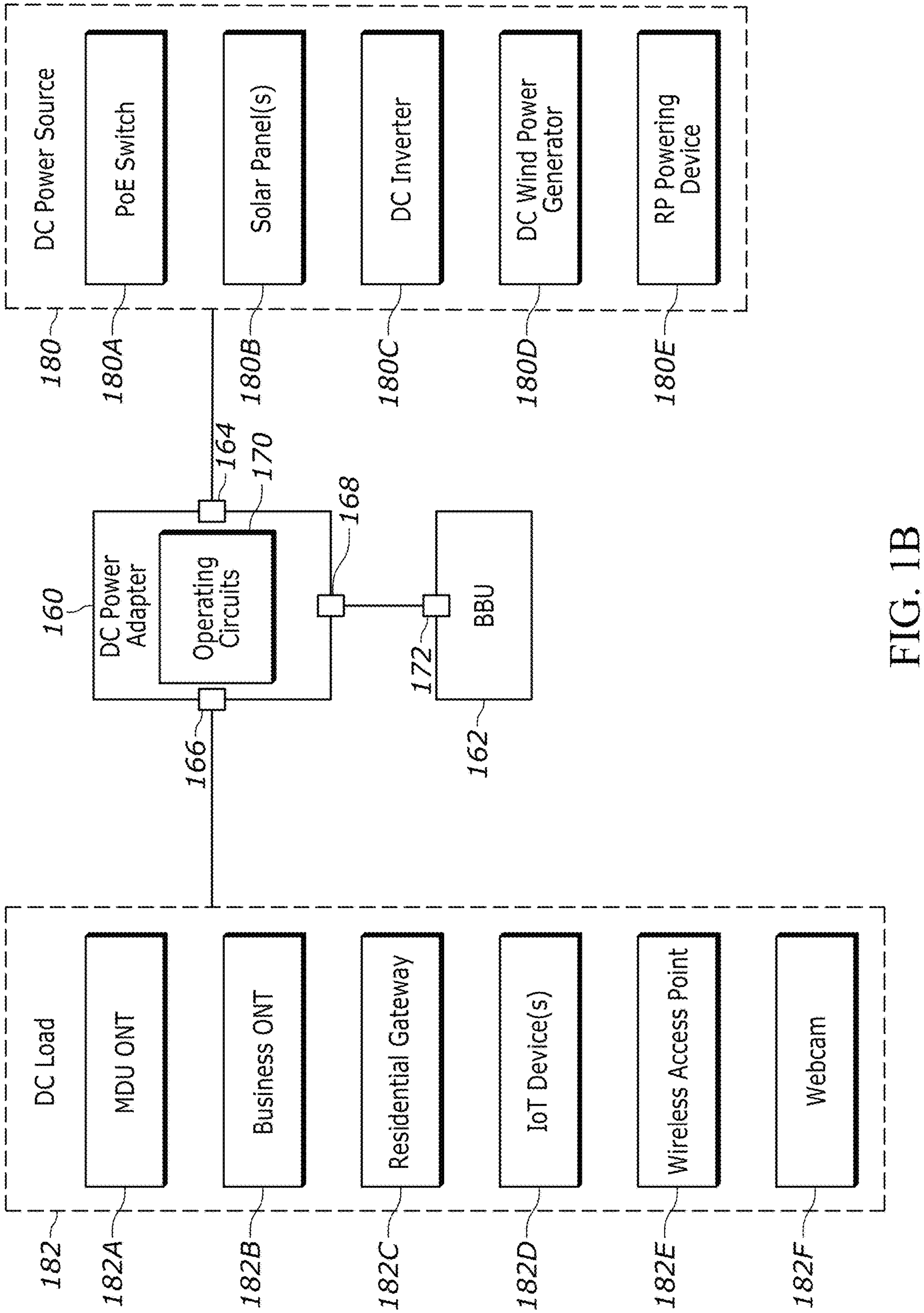
FIG. 1B is a block diagram of the DC power adapter of FIG. 1A connected to various DC power sources and loads according to the systems, methods, and/or techniques of the present disclosure.

As shown in FIG. 1B, the DC power adapter 160 may be generally powered from a DC power source 180 to provide conditioned DC power to a DC load 182. The components that makes up the operating circuits 170 may be selected and modified to accept the voltage or range of voltage provided by the DC power source 180 (e.g., 12V, 24V, 36V, 48V, etc.) and output a voltage and current sufficient to power the DC load 182. In some embodiments, the power conditioning and control circuits 170 may include one or more programmable components such as an FPGA, processors, etc. that may be controlled by firmware or software instructions to modify the DC power adapter 160 to accept and provide the desired voltages and currents. As shown in FIG. 1B, the DC power source 180 may include, but is not limited to a PoE line, cable, and/or switch 180A, solar panel(s) 180B, a DC inverter 180C, a DC wind power generator 180D, and/or one or more reverse power sources 180E (such as the TUs 112*a*-112*n* of FIG. 1A). Additionally, the DC load 182 may include, but it not limited to, a multi dwelling optical network terminal (MDU ONT) 182A (e.g., the MU-ONT 102), a business ONT 182B, a residential network gateway 182C, internet of things (IoT) device(s) 182D, a wireless access point 182E, or a webcam 182F, to name a few. As such, the DC load 182 may include any of the various types of networking equipment as described herein. This networking equipment may include equipment for managing and operating a wide area network such as a PON or copper network as described herein and/or customer premises equipment such as a customer switch, router, etc.

Example Passive Optical Network (PON)

Figure 2:
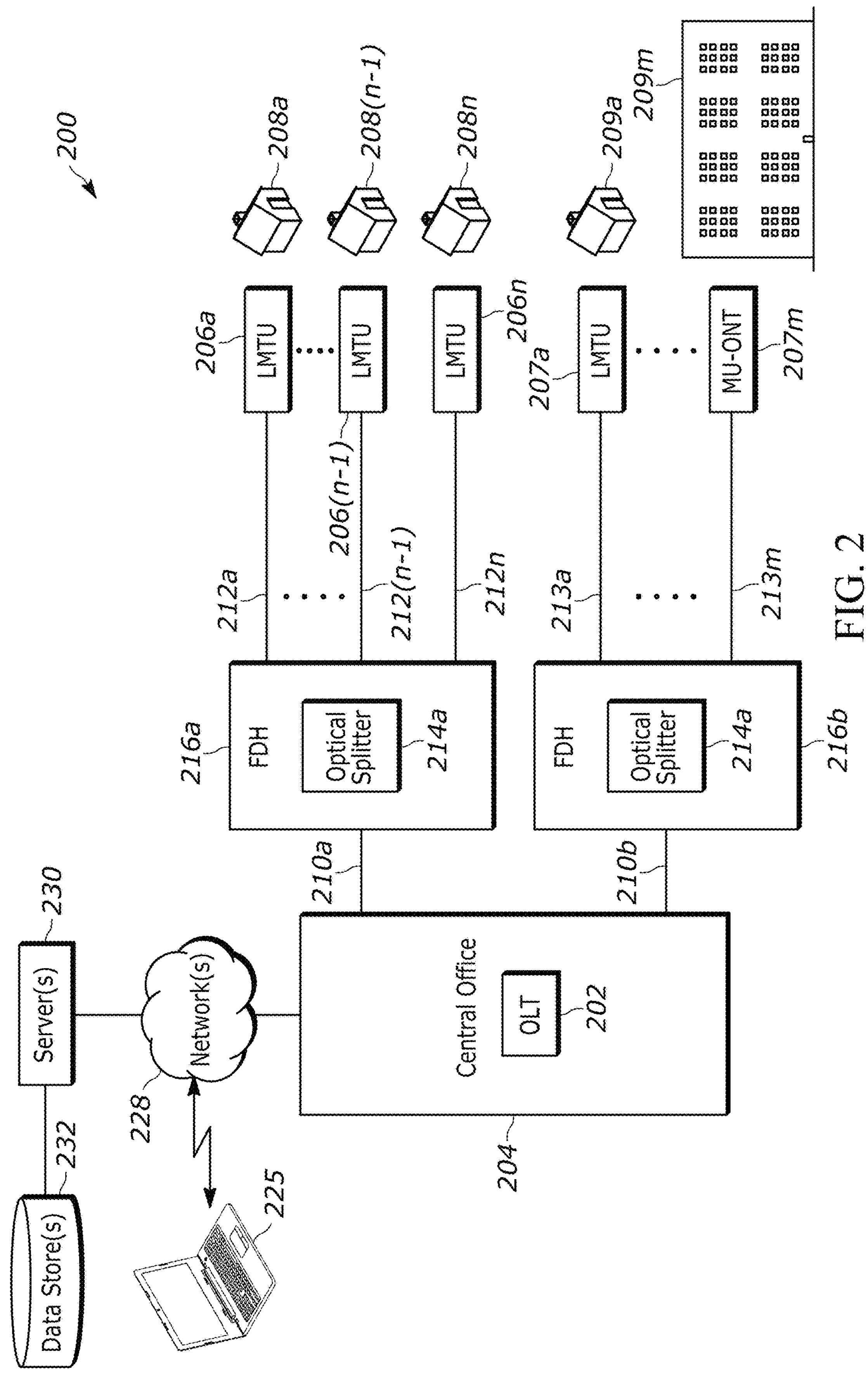
FIG. 2 is a block diagram of an example Passive Optical Network (PON) which may operate in conjunction with the systems, methods, and techniques of the present disclosure. For example, the example MU-ONT of FIG. 1A may be a node of the example PON of FIG. 2.

FIG. 2 is a block diagram of an example PON 200 which may operate in conjunction with the systems, methods, and techniques of the present disclosure. For example, the PON 200 may be the PON 110 of FIG. 1A, in an embodiment. The example PON 200 includes one or more optical line terminals (OLTs) (an example one of which is designated by reference numeral 202) at a central location (e.g., at a central office 204) optically connecting to one or more last mile termination units (LMTUs) 206*a*, . . . , 206*n* at respective customer premises 208*a*, . . . , 208*n*. The last mile termination units 206*a*, . . . , 206*n* may be located outside and/or inside the customer premises or locations 208*a*, . . . , 208*n*. Each last mile termination unit 206*a*, . . . , 206*n* may be, for example, an optical network unit (ONU) or an optical network terminal (ONT). For One or more of the LMTUs 206*a*-206*n* may be an MU-ONT, such as the MU-ONT 102 of FIG. 1A.

The example PON 200 is implemented using instances of point-to-multipoint topology. For example, in the example PON 200, a first feeder optical fiber 210*a* from the OLT 202 (which is interchangeably referred to herein as an "F1 optical fiber 210*a*" or a "primary optical fiber 210*a*") serves the one or more last mile termination units 206*a*, . . . , 206*n* via respective distribution optical fibers 212*a*, . . . , 212*n* (which are interchangeably referred to herein as "F2 optical fibers 212*a*, . . . , 212*n*" or "secondary optical fibers 212*a*, . . . , 212*n*"). In the illustrated example, the first feeder optical fiber 210*a* is optically coupled to the plurality of last mile termination units 206*a*, . . . , 206*n* via an example one-to-many optical splitter 214*a* which is disposed, located, implemented, etc. in an example fiber distribution hub (FDH) 216*a*. In some arrangements, the FDH 216*a* is located within a geographic area (e.g., a neighborhood) such that the customer premises 208*a*, . . . , 208*n* are proximally close to the FDH 216*a*, and typically each of the customer premises 208*a*, . . . , 208*n* and respective last mile termination units 206*a*, . . . , 206*n* is disposed at a different optical distance from the FDH 216*a*. An "optical distance," as generally utilized herein, refers to a distance over which an optical signal travels or is delivered.

In embodiments, the PON 200 may or may not include additional feeder optical fibers and optical splitters for a plurality of additional customer premises. Moreover, a PON may or may not include a plurality of FDHs. For example, as shown in FIG. 2, the example PON 200 includes a second feeder or primary optical fiber 210*b* from the OLT 202 that is optically coupled to another plurality of last mile termination units 207*a*-207*m* at respective customer premises 209*a*-209*m* via another many-to-one optical splitter 214*b* included in another fiber distribution hub 216*b* and via respective secondary optical fibers 213*a*-213*m*. As depicted in FIG. 2, the LMTU denoted by reference 207*m* is an MU-ONT, such as the MU-ONT 102 of FIG. 1A, which services a multi-unit building 209*m*, such as the multi-unit building 105 of FIG. 1A.

As utilized herein, the "components" of the PON 200 generally refer to the devices, nodes, and optical fibers of the PON 200. For example, the components of the PON 200 shown in FIG. 2 may include the OLT 202, the FDHs 216*a*, 216*b*, the splitters 214*a*, 214*b*, the LMTUs 206*a*-206*n* and 207*a*-207*m*, and the optical fibers interconnecting the devices or nodes, e.g., the optical fibers 210*a*-210*b*, 212*a*-212*n*, and 213*a*-213*m*.

In some scenarios, an optical terminal (e.g., the OLT 202 and/or one or more the last mile termination units 206*a*-206*n*, 207*a*-207*m*) may transmit optical test signals and/or patterns, indication light, and/or other types of measurement signals into an optical fiber in response to control signals received from a computing device. For example, the OLT 202 and/or the one or more LMTUs 206*a*-206*n*, 207*a*-207*m* may receive control signals from a computing device 225 (e.g., a laptop, a computer, a tablet, a mobile phone, etc.) associated with a service technician or other agent of the PON 200. In some examples, the computing device 225 controls an optical terminal of the PON 200 via one or more networks 228 (which may include one or more wired and/or wireless private networks and/or public networks, such as the Internet), and/or by direct interaction with the optical terminal (e.g., via a hotspot provided by the optical terminal, a service port of the optical terminal, etc., not shown in FIG. 2). Additionally and/or alternatively, control signals may be received from one or more servers 230 of the PON 200 that are used to manage the PON 200, the network(s) 228, etc. For example, the one or more servers 230 may schedule and execute diagnostics of various components of the PON 200 and/or of the PON 200 as a whole, generate alerts and alarms, initiate various actions, provide user interfaces, which may include graphical user interfaces (e.g., at the computing device 225), log, historize, and/or otherwise store data generated by and associated with the PON 200 (e.g., in one or more data stores 232), and the like. For example, one or more applications may execute at the server(s) 230 and/or the server(s) may host one or more services to provide management, administrative, and/or test functionalities of the PON 200.

Various information and data associated with, utilized by, and/or generated by the PON 200 may be stored in the data stores 232 of the PON 200. For example, the data store(s) 232 may store records of customer contact events with a technical support organization supporting the PON 200, service call records, records of operating conditions and events which occurred, logbooks, and the like. Additionally, the data store(s) 232 may store applications which may execute at the one or more servers 230, and/or which may be downloaded or otherwise provided to the technician computing device 225 for installation and execution thereon. Further, the data store(s) 232 may store data indicative of performance, faults, diagnostics, statuses, states, and/or other data corresponding to the components of the system 200. Still further, the data store(s) 232 may store data indicative of the architecture, infrastructure, and component connectivity of the PON 200, including identifications of various PON components and indications of which PON components connect to which other PON components. Of course, the data store(s) 232 may store any updates to any and all of the information and data stored therein.

Example Method at an MU-ONT

Figure 3A:
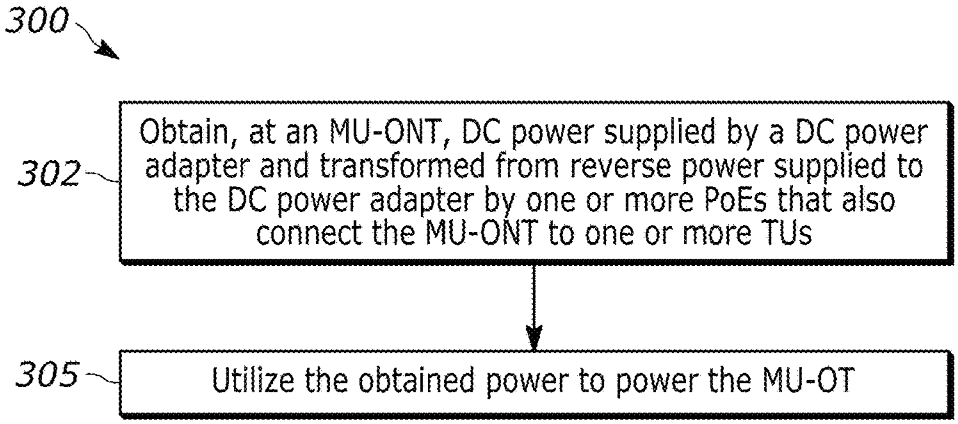
FIG. 3A is a flow diagram of an example method which may be performed by an MU-ONT, such as the example MU-ONT of FIG. 1A.

FIG. 3A illustrates a block diagram of an example method 300 which may be performed at least in part by a Multi Unit ONT, such as the MU-ONT 102 of FIG. 1A or the MU-ONT 207*m* of FIG. 2. In an example implementation, an MU-ONT may include one or more tangible memories storing a set of computer-executable instructions thereon, where the stored set of computer-executable instructions, when executed by one or more processors of the MU-ONT, may cause the MU-ONT to perform at least a portion (or all) of the method 300. For ease of discussion and not for limitation purposes, the method 300 is described herein with simultaneous reference to FIGS. 1 and 2. Further, in embodiments, the method 300 may execute in conjunction with at least portions of any other one or more methods described herein. Still further, in embodiments, the method 300 may include additional and/or alternate steps or actions, if desired.

At a block 302, the method 300 may include obtaining or receiving, by a Multi-Unit Optical Network Terminal (MU-ONT) that is disposed on an exterior of a building and that is optically connected to a passive optical network (PON), DC power supplied by a DC power adapter (e.g., DC power adapter 160) and transformed from reverse power supplied to the DC power adapter by one or more Power over Ethernet (POE) lines that also connect the MU-ONT to respective one or more terminating units (TUs) disposed within an interior of the building. The building may be a multi-unit building, such as an apartment building, an office building, a dormitory, etc. having multiple units corresponding to multiple different customers, end-users, or in-building service locations of the PON. For example, the building may be the building 105, the PON may be the PON 110, the MU-ONT may be the MU-ONT 102, the one or more PoE lines may be one or more of the PoE lines 115*a*-115*n*, and the one or more TUs may be one or more TUs 112-112*n* of FIG. 1A.

The one or more TUs may include one or more CPEs that are respectively servicing different units within the multi-unit building, where each CPE may be a local router, modem, switch, etc. corresponding to a respective serviced unit (such as TUs 112*a*-112(*n*−1) respectively servicing units 118*a*-118(*n*−1), for example). At least one of the TUs disposed within the building (e.g., TU 112*n*) may not service any specific unit within the building, but instead may be disposed in a common area of the multi-unit building, such as a basement, attic, utility room, hallway, entry way, etc. Such TUs (e.g., TU 112*n*) may or may not be a node of any in-building local wireless network. Said another way, such TUs (e.g., TU 112$n$) may or may not allow or provide mechanisms for other devices to wirelessly connect thereto.

The MU-ONT may be, for example, an Optical Line Terminal (OLT), a Multi Dwelling Unit (MDU) ONT, a switch, a router, or similar device that optically connects the multi-unit building to the PON and thereby is able to provide optical services to various TUs within the multi-unit building. Accordingly, the MU-ONT may be a terminal or node of the PON, and as such may be configured to receive optical signals via the PON and transmit, route, and/or provide payload of the optical signals to respective TUs within the building for consumption at the TUs, e.g., in accordance with respective optical services provided at the TUs. Similarly, the MU-ONT may be configured to receive signals generated by the TUs which correspond to optical services, and may be configured to generate and transmit, via the PON, optical signals which include the payloads of the signals generated by the TUs.

The DC power obtained at block 302 by the MU-ONT may have been converted from reverse power supplied by and injected into the one or more PoE lines, for example, locally at corresponding TUs.

Figure 3B:
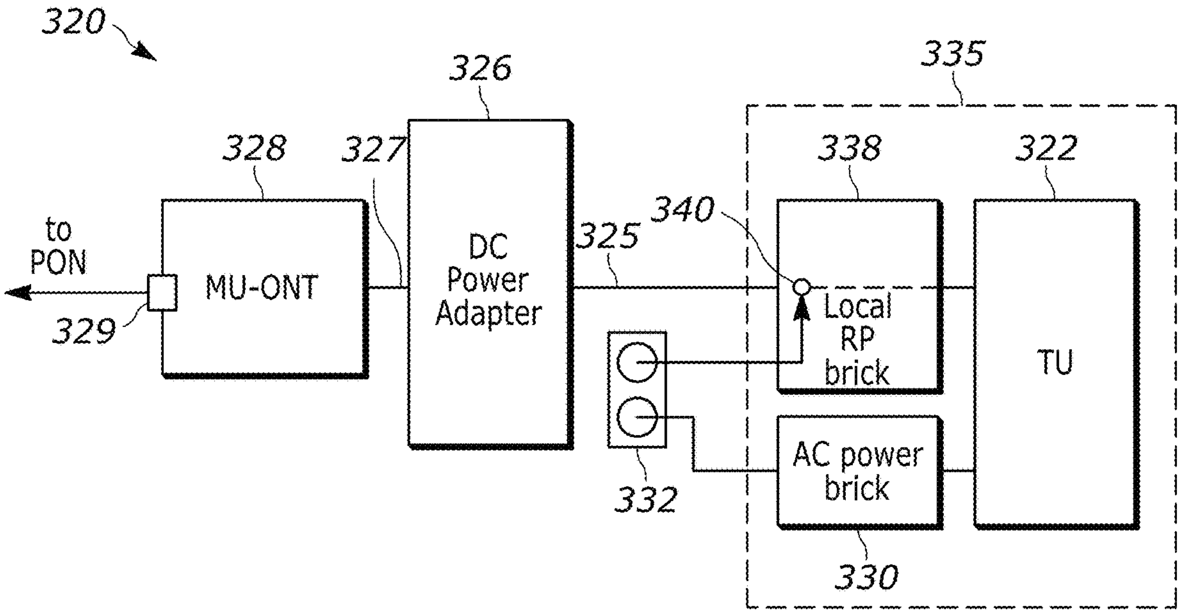
FIG. 3B is a block diagram of an example local reverse power injection configuration, which may be utilized in conjunction with the principles and techniques described herein.

An example embodiment of a configuration 320 for locally injecting reverse power into a PoE line is shown in FIG. 3B. In the local reverse power injection configuration 320, a TU 322 that is disposed within the interior of a multi-unit building is communicatively connected, via a PoE line 325, to a DC power adapter 326 which is communicatively coupled to the MU-ONT 328 by a line 327 (e.g., another PoE line or similar wired power connection). The MU-ONT 328 servicing the multi-unit building, where the MU-ONT 328 is disposed on the exterior of the multi-unit building and is optically connected to a passive optical network (PON) via an optical network interface 329. For example, the TU 322 may be one of the TUs 112$a$-112($n$−1) of FIG. 1A, the PoE line 325 may be a corresponding PoE line 115$a$-115($n$−1) of FIG. 1A, the DC power adapter 326 may be the DC power adapter 160, the MU-ONT 328 may be the MU-ONT 102, and optical network interface 329 may be the optical network interface 106 of FIG. 1A. Data (e.g., signaling, payload, metadata, etc.) corresponding to optical services provided via a PON (e.g., the PON 110) may be delivered between the MU-ONT 328 and the TU 322 via the PoE line 325, e.g., such as in manners described elsewhere herein.

For example, where the line 327 is also of PoE line, the DC power adapter 326 may be configured to pass data transmitted on the line 327 to the PoE line 325 or vise versa (e.g., by stripping and repackaging the data as required. However, in alternative embodiments (not shown) data transmissions between the TU 322 and the MU-ONT 328 may be handled by a separate data only connection from the PoE line 325 and the line 327. Additionally or alternatively, the data and power components of the PoE line 325 may be split before being connected to the DC power adapter 326. In these embodiments, the line 327 is configured solely to provide power to the MU-ONT 328.

In the local reverse power injection configuration 320, the TU 322 itself may be supplied with power via an alternating current (AC) power brick or device 330 which is connected to (e.g., plugged into) mains power 332. Typically, mains power 332 is provided via an outlet within the unit 335 being serviced by the TU 322. The configuration 320 may also include a local reverse power (RP) brick or device 338 which is also connected to (e.g., plugged into) mains power 332, e.g., via the same or a different outlet as the TU 322 located within the unit 335, or via an outlet which is located outside of the unit 335 but nonetheless disposed inside the multi-unit building. The local RP brick 338 may be configured to convert AC power obtained from mains power 332 into PoE-compatible power, and to inject 340 the converted, PoE-compatible power into the PoE line 325 for supplying reverse power to the DC power adapter 326. For example, the local RP brick 335 may include a converter which converts AC power obtained from mains power 332 into PoE type 3 power or PoE type 4 power (e.g., PoE type 3 at a minimum), and the local RP brick 338 may inject 340 the converted power into the Cat6/Cat6A Ethernet cable 325 connecting the TU 322 to the DC power adapter 326. It is understood that although FIG. 3B illustrates power being injected 340 into the PoE line 325 at or near the TU 322, this is only one possible implementation. Indeed, a local RP brick 338 via which power may be injected 340 into the PoE line 325 may be located anywhere along the length of the PoE line 325 within the interior of the building, as desired.

When PoE line 325 is the only PoE line providing reverse power to the DC power adapter 326, the reverse power injected 340 into the PoE line 325 may include at least 50 watts of power. For example, the injected reverse power supplied to the DC power adapter 326 via the only PoE line 325 may include 50-60 watts of power. In an embodiment, the only PoE line 325 (which may be a PoE type 3 line, as a minimum) may be in accordance with the IEEE 802.3bt standard, the maximum power per port may be 60 watts, the power to the powered DC power adapter 326 may be at least 51 watts, the PoE line 325 may include a 2- or 4-pair twisted pair, the operational voltage of the PoE line 325 may be 50 to 57 volts, and the voltage supplied by the DC power adapter 326 to the powered device (e.g., to the MU-ONT 328) may be 42.5 to 57 volts.

In some implementations, multiple PoE lines may provide reverse power to the DC power adapter 326. That is, the DC power adapter 326 may obtain an aggregation of the reverse power provided by the multiple PoE lines for use in powering the MU-ONT 328. In these implementations, a respective local reverse power injection configuration 320 corresponding to each TU of multiple TUs disposed within the multi-unit building may be utilized to provide the reverse power. For example, a respective reverse power injection configuration 320 may be implemented for two or more (or all) of the TUs 112$a$-112$n$ (e.g., for two or more (or all) of the PoE lines 115$a$-115$n$ of the TUs 112$a$-112$n$) disposed within the building 105. In these situations, the power load required by the MU-ONT 328 and delivered by the DC power adapter 326 may be shared across the multiple PoE lines providing reverse power (e.g., in an aggregate or collective manner), and the injected reverse power provided via the multiple PoE lines may include at least 50 watts of power in total. For example, the injected reverse power provided via the multiple PoE lines may include 50-60 watts of power in total.

Figure 3C:
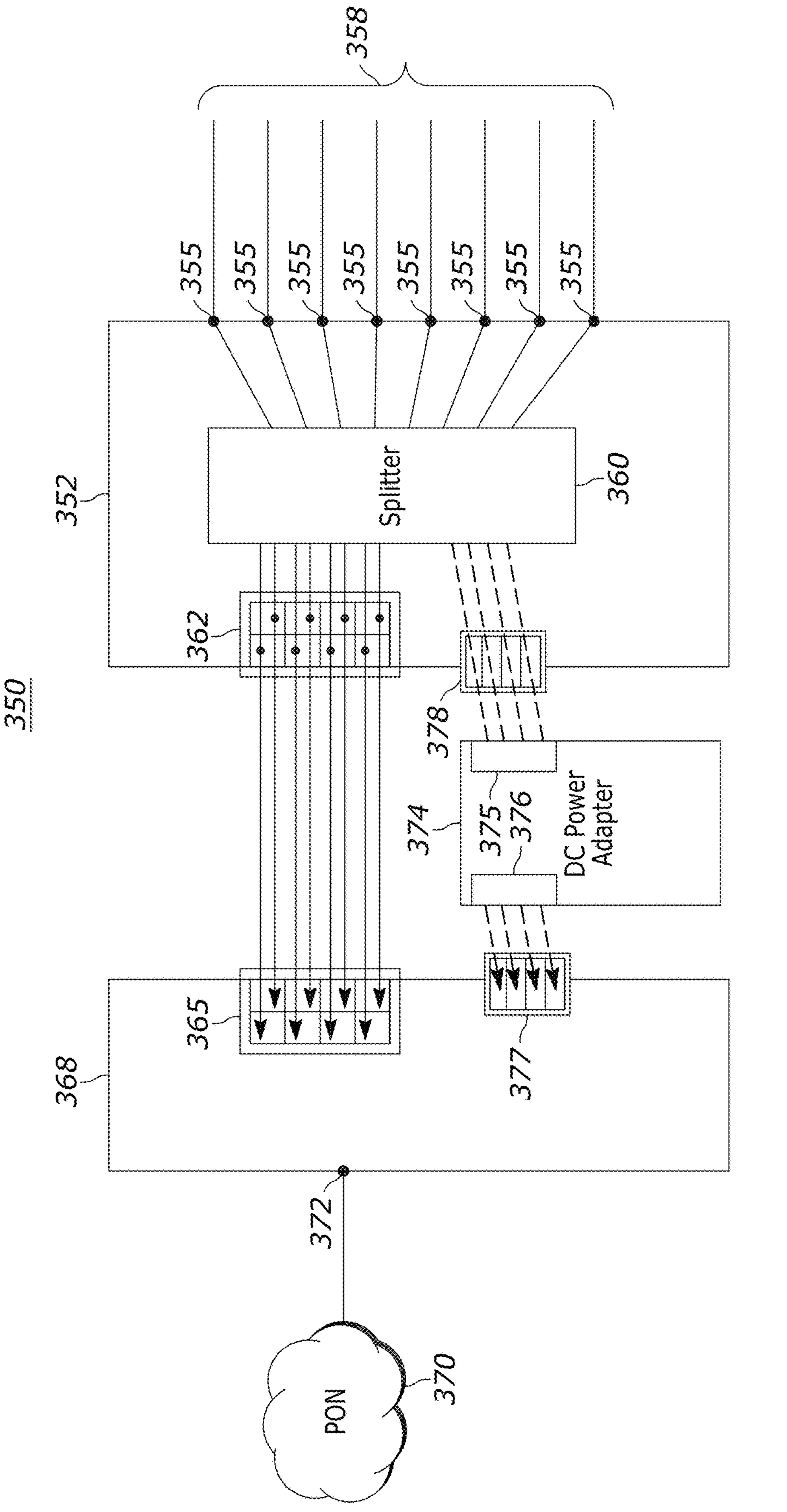
FIG. 3C is a block diagram of an example configuration of providing reverse power to a DC power adapter via multiple Power over Ethernet (POE) lines to power an MU-ONT, which may be utilized in conjunction with the principles and techniques described herein.

To illustrate, FIG. 3C depicts an example configuration 350 of powering an MU-ONT using reverse power provided to a DC power adapter via multiple PoE lines. The example configuration 350 includes an MU-ONT reverse power (RP) device 352 which may be, in an embodiment, the MU-ONT RP device 130 of FIG. 1A. The MU-ONT RP device 352 includes a plurality of PoE ports 355 into which a plurality of PoE lines 358 are received, where power has been injected (e.g., has been locally injected) into each of the PoE line 358, e.g., in manners such as discussed elsewhere herein. Each PoE line 358 may terminate at a respective TU located within a multi-unit building. As such, each PoE port 355 may receive, via a respective PoE line 358, data generated by a respective TU (where the generated data may be related to signaling, payload, metadata, and/or other information corresponding to optical services) as well as injected power (where the power may have been injected at the respective TU or somewhere else along the length of the respective PoE line 358 within the building).

The MU-ONT RP device 352 includes a splitter 360 which splits power received via the PoE lines 358 from the data received via the PoE lines 358. The splitter 360 may be connected to a plurality of data ports 362 of the MU-ONT RP device 352, and the splitter 350 may route the (split-out) data received via PoE lines 358 to the plurality of data ports 362, which are communicatively connected to a plurality of data ports 365 of an MU-ONT 368. The data ports 362 of the MU-ONT RP device 352 and the data ports 365 of the MU-ONT 368 may be Ethernet-compatible data ports, in an embodiment. Thus, within the MU-ONT RP device 352, the splitter 360 may be connected to both the plurality of PoE ports 355 as well as the plurality of plurality of data ports 362. Further, the MU-ONT 368 may be optically connected to a PON 370 via optical network interface 372, and may transmit optical signals including the payloads of the split-out data to the PON 370 via the optical network interface 372. The MU-ONT 368 may be the MU-ONT 102, the plurality of data ports 365 of the MU-ONT 368 may be the data ports 142 of the MU-ONT 102, the optical interface 372 of the MU-ONT 368 may be the optical network interface 106, and the PON 370 may be the PON 110, for example.

On the other hand, the splitter 360 may provide the (split-out) power supplied by the PoE lines 358 to one or more input power ports 375 of a DC power adapter 374 (e.g., the DC power adapter 160, DC power adapter 326, etc.) via one or more output power ports 378 of the MU-ONT RP device 352. The DC power adapter 374 in turn converts the reverse power received at the input power ports 375 into stable and filter DC power that is supplied to MU-ONT power input port(s) 377 of the MU-ONT 368 from DC power output ports 376 of the DC power adapter 374. As such, within the MU-ONT RP device 352, the splitter 360 may be connected to both the plurality of PoE ports 355 as well as the plurality of plurality of output power ports 378. The one or more input power ports 377 of the MU-ONT 368 may include at least one DC power port, such as a 48 Volt DC power port, and the MU-ONT 368 may utilize the power obtained via its input power ports 377 to power its operations. The total power received via the input power ports 377 of the MU-ONT 368 may be at least 50 watts. For example, the power received via the input power ports 377 of the MU-ONT 368 may include 50-60 watts of power in total, and/or may include sufficient power (in total) to support the power load required or utilized by the MU-ONT 368. As such, the power load of the MU-ONT 368, via the intermediary of the DC power adapter 374, may be shared across multiple PoE lines 358. For example, as more PoE lines 358 are connected into the MU-ONT RP device 352, the newly connected PoE lines 358 may assume some portion of the power load of the MU-ONT 368.

The sharing of the power load required by the MU-ONT 368 may be performed via passive or active load sharing mechanisms. For example, the multiple connected PoE lines 358 may operate as parallel power supplies for the MU-ONT 368 via the intermediary of the DC power adapter 374 so that the load is evenly distributed or balanced among the PoE lines 358. Active feedback mechanisms such as droop sharing and/or active current sharing may be utilized to ensure that each PoE line 358 contributes equally or evenly to the load.

In some situations, voltage feedback control loops and/or mechanisms may be utilized to actively control load sharing. In an example, one of the PoE lines 358 may have inconsistent input voltage and/or input voltage that exceeds some boundary condition. The MU-ONT RP device 352 may omit the inconsistently-behaving PoE line 358 from load sharing so that its injected power is not supplied (or is prevented from being supplied) to the DC power adapter 374 and in turn the MU-ONT 368. In another example, the MU-ONT RP device 352 may include a voltage regulator (not shown) which may monitor respective input voltages supplied by each of the PoE lines 358 and maintain a constant output voltage at the output power ports 378 of the MU-ONT RP device 352 irrespective of variations of input voltages of the PoE lines 358 and/or irrespective of changing load conditions of the MU-ONT 368 as relayed by the DC power adapter 374. In yet another example, the MU-ONT RP device 352 may include a controller (not shown) which may monitor the respective current supplied by each of the PoE lines 358 and may adjust (e.g., may control) the output voltages of the output power ports 378 of the MU-ONT RP device 352 so that the load is balanced or shared among the PoE lines 358. Thus, in some situations, the sharing of the power load of the MU-ONT 368 across multiple PoE lines 358 may include distributing the power load of the MU-ONT 368 across the PoE lines 358 based on respective characteristics of the multiple PoE lines, such as input current and/or input voltage, which may result in an unequal distribution of the MU-ONT power load across the multiple PoE lines 358. In some embodiments, some or all of the components of the MU-ONT RP device 352 may be included within the DC power adapter 374.

Advantageously, in some embodiments, the data ports 365 and the input power ports 377 of the MU-ONT 368 are existing data ports 365 and input power ports 377. That is, when the MU-ONT 368 is a legacy MU-ONT, the legacy MU-ONT 368 need not be retrofitted or re-configured to support being supplied with power from the DC power adapter 374. Furthermore, the DC power adapter 374 may enable retrofit of legacy MU-ONTs to different kinds of available DC power sources (including the reverse power of the PoE lines disposed within the building to which the MU-ONT 368 is mounted) by varying or changing the configurations of the one or more input power ports 375 and the DC power output ports 376. In some embodiments, the DC power adapter 374 may include multiple different sets of primary DC power input ports and primary DC power outputs so that the DC power adapter 374 can operate with different legacy systems and DC power inputs without modification. It should be appreciated that the DC power adapter 374 may also include connection for a BBU (e.g., BBU 162) as described herein for providing backup battery power to the MU-ONT 368 when the DC power supplied to the one or more input power ports 375 is unavailable or inoperative.

Further, while the MU-ONT RP device 352 is depicted in FIG. 3C as being a separate and distinct device from the MU-ONT 368 and the DC power adapter 374, this is for ease of illustration purposes only. Indeed, in some embodiments, the MU-ONT RP device 352 and the DC power adapter 374 may be included in the MU-ONT 368; that is, the MU-ONT 368, the DC power adapter 374, and/or the MU-ONT RP device 352 may be an integral device. As such, the MU-ONT 368 may include the PoE ports 355 into which the PoE lines 358 are received and the splitter 360, for example.

Returning now to FIG. 3A, at a block 305, the method 300 may include utilizing the obtained power to power the MU-ONT. For example, the reverse power supplied by at least some of the PoE lines 115*a*-115*n*, 325, and/or 358 to the DC power adapters described herein may be utilized to power the MU-ONT 102, 328, and/or 368. In some implementations, the reverse power supplied by the PoE lines is the only primary power which is utilized to power the MU-ONT. That is, the MU-ONT may not obtain and/or utilize power provided by any third-party power source or any external power source located outside of (external to) to the multi-unit building, with the exception of the back-up battery of the BBU for the MU-ONT. However, in some instances the BBU may be omitted.

Example Method of Powering an MU-ONT Using a DC Power Adapter

Figure 4:
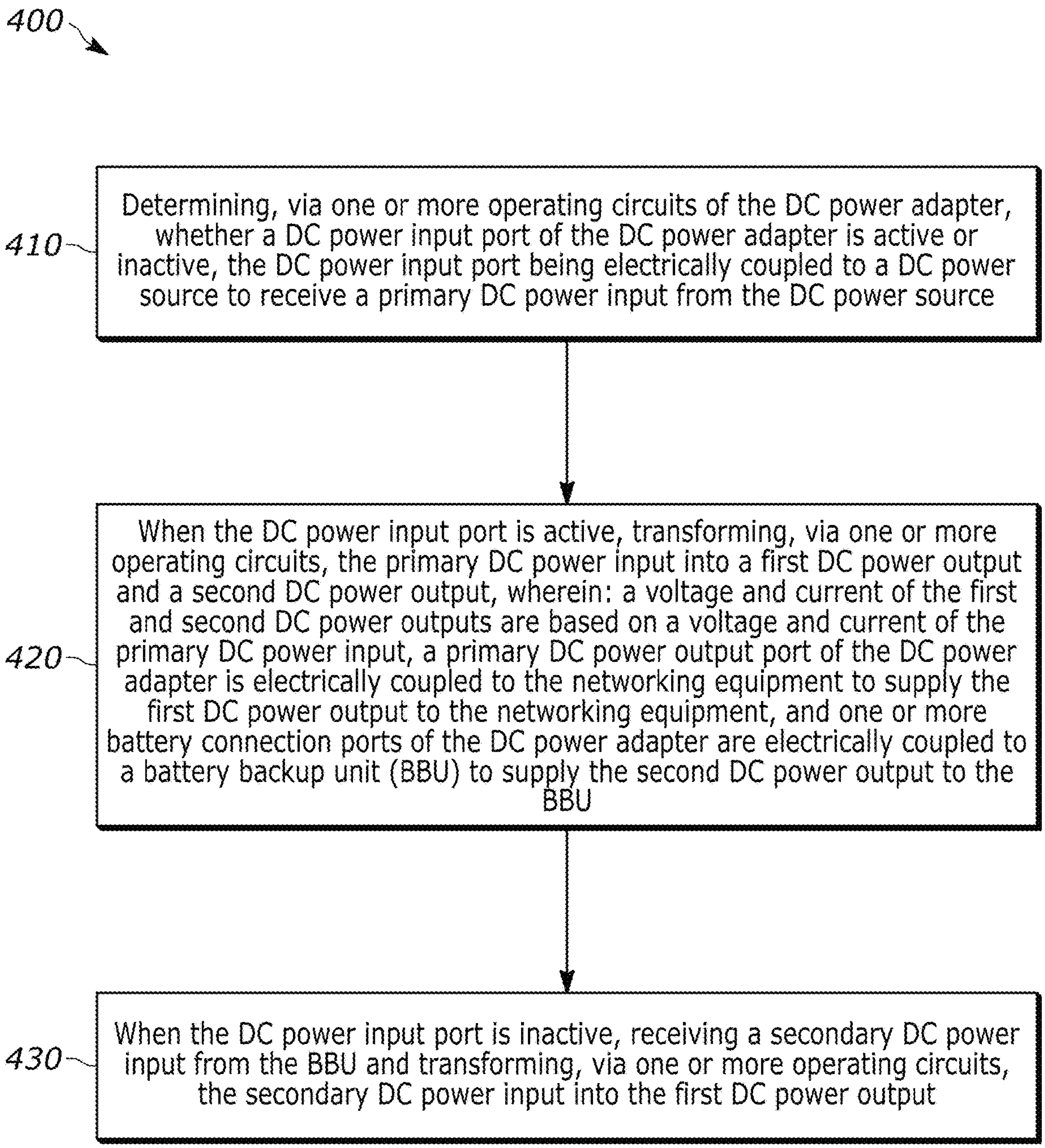
FIG. 4 is a flow diagram of an example method for powering an MU-ONT, such as the example MU-ONT of FIG. 1A via a DC power adapter.

FIG. 4 illustrates a block diagram of an example method 400 which may be performed at least in part by a direct current (DC) power adapter (e.g., the DC power adapter 160, DC power adapter 326, or DC power adapter 374) to provide power to networking equipment (e.g., the MU-ONT 102, MU-ONT 328, MU-ONT 368, and/or the various DC loads 182 shown in FIG. 1B).

At block 410, the method 400 includes determining or detecting, via one or more operating circuits (e.g., the one or more operating circuits 107) of the DC power adapter, whether a DC power input port (e.g., DC power input port 164) of the DC power adapter is active or inactive, the DC power input port being electrically coupled to a DC power source (e.g., the MU-ONT RP device 130, unit 335, MU-ONT RP device 352, and/or the various DC power sources 180) to receive a primary DC power input from the DC power source. The voltage of the primary DC power input may be in a range of 20 to 60 volts. The networking equipment may be an Optical Line Terminal (OLT), a Multi Dwelling Unit (MDU) ONT, a switch, a router, a business ONT, a residential gateway, one or more IoT devices, a wireless access point, or a webcam. The DC power adapter and the networking equipment may be an integral device or distinct, separate devices.

The DC power source may include a reverse powering device having one or more Power over Ethernet (POE) ports via which one or more PoE lines are received, each PoE line providing reverse power that is supplied the DC power input port. The reverse power supplied by the one or more PoE lines may been injected into the one or more PoE lines. In these embodiments, the networking equipment may include the MU-ONT disposed on an exterior of a building and each PoE line may connect the reverse powering device to a respective one of one or more Terminating Units (TUs) disposed within an interior of the building. The building may be a multi-unit building, the one or more TUs may include multiple customer premises equipments (CPEs) disposed within the interior of the multi-unit building, and each CPE services may be a different unit of the multi-unit building.

The power conditioning circuits may include at least one transformer that isolates the primary DC power input or the secondary DC power input from direct connection to the first DC power output. The power conditioning circuits may also include one or more of an inductor and a capacitor that filter the primary DC power input or the secondary DC power input to reduce noise or ripple present in the first DC power output. The power conditioning circuits may additionally include at least one protection component that disconnect the DC power input or the secondary DC power input from the first DC power output in response to a surge condition. The control circuits may include active or passive components that transform the primary and secondary DC power input; and determine whether the DC power input port is active or inactive.

At block 420, the method 400 includes, when the DC power input port is active, transforming, via one or more operating circuits, the primary DC power input into a first DC power output and a second DC power output. The voltage and current of the first and second DC power outputs are based on a voltage and current of the primary DC power input, a primary DC power output port (e.g., primary DC power output port 166) of the DC power adapter is electrically coupled to the MU-ONT to supply the first DC power output to the networking equipment, and one or more battery connection ports (e.g., one or more battery connection ports 168) of the DC power adapter are electrically coupled to a battery backup unit (BBU) (e.g., BBU 162) to supply the second DC power output to the BBU. The BBU may includes a Lithium Iron Phosphate ($LiFePO_4$) type battery. Additionally or alternatively, the BBU may include any suitable battery technology having a charge capacity configured to support a full load of the networking equipment for at least 24 hours.

The one or more battery connection ports may include a secondary DC power input port configured to electrically couple to a power output port of the BBU and receive the secondary DC power input and a secondary DC power output port configured to electrically couple to a power input port of the BBU and supply the second DC power output to the BBU. The one or more battery connection ports may also include a single connector configured to supply the second DC power output and receive the secondary DC power input.

In some embodiments, the method 400 may include, when the DC power input port is active and the voltage and current of the primary DC power input is insufficient to supply approximately 5 Amps to the BBU, transforming, via the one or more operating circuits, the primary DC power input into the first DC power output and the second DC power output such that the first DC power output provides at least 0.5 Amps to the networking equipment and the second DC power output provides a trickle charge to the BBU. Additionally, the method 400 may include when the DC power input port is active and the voltage and current of the primary DC power input is greater than 5 Amps, transforming, via the one or more operating circuits, the primary DC power input into the first DC power output and the second DC power output such that the first DC power output is maintained at less than 1.1 Amps at 54 VDC and remaining available power is allocated to the second DC power output to recharge the BBU. In some embodiments, the one or more operating circuits may employ an intelligent charge control process to recharge the BBU (e.g., charging the BBU slower of faster based on a current charge state of the BBU to preserve battery longevity over time). In some embodiments, the one or more operating circuits may be configured to charge the BBU using constant-current/constant-voltage (CC/CV) methods with temperature and state of charge (SoC) monitoring to provide the intelligent recharging capabilities.

At block 430, the method 400 includes, when the DC power input port is inactive, receiving a secondary DC power input from the BBU and transforming, via one or more operating circuits, the secondary DC power input into the first DC power output.

The method 400 may include the one or more operating circuits determining that the DC power input port is active when the primary DC power input is greater than a threshold; and the one or more operating circuits determining that the DC power input port is inactive when the primary DC power input is less than the threshold.

ADDITIONAL CONSIDERATIONS

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term “logic circuit” is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms “tangible machine-readable medium,” “non-transitory machine-readable medium” and “machine-readable storage device” is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms “tangible machine-readable medium,” “non-transitory machine-readable medium” and “machine-readable storage device” is expressly defined to exclude propagating signals. That is, as used in any claim of this patent, none of the terms “tangible machine-readable medium,” “non-transitory machine-readable medium,” and “machine-readable storage device” can be read to be implemented by a propagating signal.

In the foregoing specification, specific examples have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of the disclosure. Additionally, the described examples should not be interpreted as mutually exclusive, and should instead be understood as potentially combinable if such combinations are permissive in any way. In other words, any feature disclosed in any of the aforementioned examples may be included in any of the other aforementioned examples.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms “comprises,” “comprising,” “has”, “having,” “includes”, “including,” “contains”, “containing” or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by “comprises . . . a”, “has . . . a”, “includes . . . a”, “contains . . . a” does not, without more constraints, preclude the existence of additional identical elements in the process, method, article, or apparatus that comprises, has, includes, contains the element. The terms “a” and “an” are defined as one or more unless explicitly stated otherwise herein. The terms “substantially”, “essentially”, “approximately”, “about” or any other version thereof, are defined as being close to as understood by one of ordinary skill in the art, and in one non-limiting example the term is defined to be within 10%, in another example within 5%, in another example within 1% and in another example within 0.5%. The term “coupled” as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter may lie in less than all features of a single disclosed example. Thus, the following claims are hereby incorporated into the Detailed Description, with each claim standing on its own as a separately claimed subject matter.

Further, as used herein, the expressions "in communication," "coupled" and "connected," including variations thereof, encompasses direct communication and/or indirect communication through one or more intermediary components, and does not require direct mechanical or physical (e.g., wired) communication and/or constant communication, but rather additionally includes selective communication at periodic intervals, scheduled intervals, aperiodic intervals, and/or one-time events. The examples are not limited in this context.

Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

Moreover, in the foregoing specification and the attached drawings, specific examples have been described. However, one of ordinary skill in the art appreciates that various modifications and changes can be made in view of aspects of this disclosure without departing from the scope of the disclosure as set forth in the claims below. Accordingly, the specification and figures are to be regarded in an illustrative rather than a restrictive sense, and all such modifications made in view of aspects of this disclosure are intended to be included within the scope of present teachings. Numerous alternative examples could be implemented, using either current technology or technology developed after the filing date of this patent, which would still fall within the scope of the claims. By way of example, and not limitation, the disclosure herein contemplates at least the following examples:

Additionally, the benefits, advantages, solutions to problems, and any element(s) that may cause any benefit, advantage, or solution to occur or become more pronounced are not to be construed as a critical, required, or essential features or elements of any or all the claims.

Finally, any references, including, but not limited to, publications, patent applications, and patents cited herein are hereby incorporated in their entirety by reference to the same extent as if each reference were individually and specifically indicated to be incorporated by reference and were set forth in its entirety herein.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A direct current (DC) power adapter for a networking equipment, the DC power adapter comprising:

a DC power input port configured to electrically couple to a DC power source and receive a primary DC power input from the DC power source;

a primary DC power output port configured to electrically couple to the networking equipment and supply a first DC power output to the networking equipment;

one or more operating circuits electrically connected between the DC power input port and the primary DC power output port, the one or more operating circuits configured to:

modify the primary DC power input into the first DC power output when the DC power input port is active, the first DC power output having a voltage and a current based on a voltage and a current of the primary DC power input; and when the DC power input port is active, transform at least a portion of the primary DC power input into a second DC power output supplied to a battery back-up unit (BBU) to recharge the BBU, the at least the portion of the primary DC power input being insufficient to supply a full charging current to the BBU, and the second DC power output being one of (i) a trickle charge, or (ii) a remainder of available power of the primary DC power input while the first DC power output is maintained at less than 1.1 Amps at approximately 54 VDC.

2. The DC power adapter of claim 1, wherein the one or more operating circuits are configured to transform a secondary DC power input received from the battery back-up unit (BBU) into the first DC power output when the DC power input port is inactive.

3. The DC power adapter of claim 2, further comprising:

a secondary DC power input port configured to electrically couple to a power output port of the BBU and receive the secondary DC power input; and a secondary DC power output port configured to electrically couple to a power input port of the BBU and supply a second DC power output to the BBU.

4. The DC power adapter of claim 2, further comprising a single connector configured to supply a second DC power output to the BBU and to receive the secondary DC power input from the BBU.

5. The DC power adapter of claim 2, wherein the one or more operating circuits are configured to seamlessly transition, in 10 milliseconds or less, between supplying the first DC power output based on the primary DC power input and supplying the first DC power output based on the secondary DC power input.

6. The DC power adapter of claim 2, wherein the one or more operating circuits are configured to supply a second DC power output to the BBU at a rate of charging corresponding to a current charge state of the BBU.

7. The DC power adapter of claim 1, wherein the one or more operating circuits include at least one component configured to isolate the first DC power output from the primary DC power input.

8. The DC power adapter of claim 1, wherein the one or more operating circuits include at least one component configured to filter the primary DC power input to thereby reduce at least one of noise or ripple in the first DC power output.

9. The DC power adapter of claim 1, wherein the one or more operating circuits include at least one protection component configured to disconnect the primary DC power input from the first DC power output in response to a surge condition.

10. The DC power adapter of claim 1, wherein one or more operating circuits include at least one of an active component or a passive component configured to determine if the DC power input port is active or inactive.

11. The DC power adapter of claim 10, wherein the at least one of the active component or the passive component is configured to compare the primary DC power input to a threshold to determine if the DC power input port is active or inactive.

12. The DC power adapter of claim 1, wherein the networking equipment includes a Multi-Unit Optical Network Terminal (MU-ONT) and the DC power source includes a reverse powering device associated with the MU-ONT, the reverse powering device providing reverse power to the DC power input port.

13. The DC power adapter of claim 1, wherein the networking equipment includes one or more components of a Passive Optical Network (PON).

14. The DC power adapter of claim 1, wherein the networking equipment includes one or more components of a Copper Network.

15. The DC power adapter of claim 1, wherein the DC power adapter and the networking equipment are an integral device.

16. The DC power adapter of claim 1, wherein the DC power adapter and the networking equipment are distinct, separate devices.

17. The DC power adapter of claim 1, wherein the networking equipment includes at least one of an Optical Line Terminal (OLT), an Optical Network Terminal (ONT), an Optical Network Unit (ONU), a Fiber Distribution Terminal (FDT), a Fiber Distribution Hub (FDH), a Multi Dwelling Unit (MDU) ONT, a digital service line access multiplexer (DSLAM) or other type of copper network component, networking equipment of a central office, a switch, a router, a business ONT, a residential gateway, one or more IoT devices, a wireless access point, or a webcam.

18. A method for operating a direct current (DC) power adapter to provide power to a networking equipment, the method comprising:

while a DC power input port of the DC power adapter is active:

modifying, via one or more operating circuits of the DC power adapter, a primary DC power input received from a DC power source via the DC power input port into a first DC power output, a voltage and a current of the first DC power output based on a voltage and a current of the primary DC power input;

supplying, via a DC power output port of the DC power adapter, the first DC power output to the networking equipment;

transforming, via the one or more operating circuits, at least a portion of the primary DC power input into a second DC power output; and supplying the second DC power output to a battery back-up unit (BBU) to recharge the BBU, the at least the portion of the primary DC power input being insufficient to supply a full charging current to the BBU, and the second DC power output being one of (i) a trickle charge, or (ii) a remainder of available power of the primary DC power input while the first DC power output is maintained at less than 1.1 Amps at approximately 54 VDC.

19. The method of claim 18, further comprising, when the DC power input port is inactive, transforming, via the one or more operating circuits, a secondary DC power input received from the battery back-up unit (BBU) into the first DC power output.

20. The method of claim 18, further comprising:

comparing, via the one or more operating circuits, the primary DC power input to a threshold to determine whether the DC power input port is active.

21. The method of claim 19, further comprising transitioning, in 10 milliseconds or less, between supplying the first DC power output based on the primary DC power input and supplying the first DC power output based on the secondary DC power input.

22. The method of claim 18, further comprising isolating the first DC power output from the primary DC power input.

23. The method of claim 18, further comprising filtering the primary DC power input thereby reducing at least one of noise or ripple of the first DC power output.

24. The method of claim 18, further comprising disconnecting the primary DC power input from the first DC power output in response to a surge condition.

25. The DC power adapter of claim 1, wherein the one or more operating circuits are configured to recharge the BBU by using a constant-current/constant-voltage (CC/CV) method with temperature and state of charge (SoC) monitoring.

26. The DC power adapter of claim 1, wherein the one or more operating circuits are further configured to modify the DC power adapter to accept and/or provide desired voltages and currents.

27. The DC power adapter of claim 1, wherein the one or more operating circuits are further configured to output a status alert or alarm regarding a state of the DC power adapter.

28. The method of claim 18, further comprising recharging the BBU using a constant-current/constant-voltage (CC/CV) method with temperature and state of charge (SoC) monitoring.

29. The method of claim 18, further comprising modifying, via the one or more operating circuits, the DC power adapter to accept and/or provide desired voltages and currents.

30. The method of claim 18, further comprising outputting, via the one or more operating circuits, a status alert or alarm regarding a state of the DC power adapter.

* * * * *